United States Patent
Hu et al.

(10) Patent No.: US 10,793,091 B2
(45) Date of Patent: Oct. 6, 2020

(54) DYNAMIC BANDWIDTH ADJUSTMENT AMONG VEHICLE SENSORS

(71) Applicant: GM Global Technology Operations LLC, Detroit, MI (US)

(72) Inventors: Yasen Hu, Warren, MI (US); Shuqing Zeng, Sterling Heights, MI (US); Wei Tong, Troy, MI (US); Mohannad Murad, Troy, MI (US); David R. Petrucci, Warren, MI (US); Gregg R. Kittinger, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 354 days.

(21) Appl. No.: 15/886,006

(22) Filed: Feb. 1, 2018

(65) Prior Publication Data
US 2019/0232898 A1   Aug. 1, 2019

(51) Int. Cl.
*B60R 16/023* (2006.01)
*H04Q 9/02* (2006.01)
*G05D 1/02* (2020.01)

(52) U.S. Cl.
CPC .......... *B60R 16/0231* (2013.01); *H04Q 9/02* (2013.01); *G05D 1/024* (2013.01); *G05D 1/0238* (2013.01); *G05D 1/0248* (2013.01); *G05D 1/0255* (2013.01); *G05D 1/0257* (2013.01); *G05D 2201/0201* (2013.01); *G05D 2201/0202* (2013.01); *G05D 2201/0213* (2013.01); *G05D 2201/0216* (2013.01); *H04Q 2209/86* (2013.01); *H04Q 2213/054* (2013.01)

(58) Field of Classification Search
CPC .... G05D 1/0257; G05D 1/0238; G05D 1/024; G05D 1/0255; G05D 2201/0202; G05D 2201/0216; G01S 13/867; G08B 25/08; B60R 16/0231; H04Q 9/02; H04Q 2209/86; H04Q 2213/054; G06K 9/00228
See application file for complete search history.

(56) References Cited

U.S. PATENT DOCUMENTS

| | | | | |
|---|---|---|---|---|
| 9,983,591 | B2 * | 5/2018 | Micks | G06K 9/00228 |
| 2016/0231746 | A1 * | 8/2016 | Hazelton | G01S 13/867 |
| 2017/0031363 | A1 * | 2/2017 | Laur | G05D 1/0257 |
| 2017/0217390 | A1 * | 8/2017 | Curtis | G08B 25/08 |

* cited by examiner

*Primary Examiner* — Regis J Betsch
*Assistant Examiner* — Kaleria Knox
(74) *Attorney, Agent, or Firm* — Cantor Colburn LLP

(57) ABSTRACT

A system and method to perform dynamic bandwidth adjustment among two or more vehicle sensors includes receiving input. The input includes data from each of the two or more vehicle sensors. The two or more vehicle sensors include a camera, an audio detector, a radar system, or a lidar system. The method also includes determining a bandwidth at which each of the two or more vehicle sensors should provide the data, and providing a control signal to each of the two or more vehicle sensors to adjust the bandwidth based on the determining.

18 Claims, 4 Drawing Sheets

DYNAMIC BANDWIDTH ADJUSTMENT AMONG VEHICLE SENSORS

INTRODUCTION

The subject disclosure relates to dynamic bandwidth adjustment among vehicle sensors.

Vehicles (e.g., automobiles, trucks, farm equipment, construction equipment, automated factory equipment) increasingly include sensors that facilitate augmentation and automation of vehicle systems. An exemplary type of sensor is a camera that obtains images. Multiple cameras may be arranged to obtain a 360 degree view around the perimeter of the vehicle, for example. Another exemplary type of sensor is an audio detector that obtains audio external to the vehicle. Additional exemplary sensors include a radio detection and ranging (radar) system and a light detection and ranging (lidar) system. Exemplary vehicle systems include collision avoidance, adaptive cruise control, and autonomous driving. In prior vehicles, the various sensors provide data at a constant bandwidth. Accordingly, it is desirable to provide dynamic bandwidth adjustment among vehicle sensors.

SUMMARY

In one exemplary embodiment, a method of performing dynamic bandwidth adjustment among two or more vehicle sensors includes receiving input at a processor, the input including data from each of the two or more vehicle sensors. The two or more vehicle sensors include a camera, an audio detector, a radar system, or a lidar system. The method also includes determining, using the processor, a bandwidth at which each of the two or more vehicle sensors should provide the data, and providing, by the processor, a control signal to each of the two or more vehicle sensors to adjust the bandwidth based on the determining.

In addition to one or more of the features described herein, the receiving the input includes receiving information about environmental conditions.

In addition to one or more of the features described herein, the receiving the information about the environmental conditions includes receiving weather information.

In addition to one or more of the features described herein, the receiving the input includes receiving information about the vehicle.

In addition to one or more of the features described herein, the receiving the information about the vehicle includes receiving location information, direction of travel, or vehicle dynamics information.

In addition to one or more of the features described herein, the determining the bandwidth includes increasing the bandwidth from a default bandwidth for one or more of the two or more vehicle sensors that detect an object.

In addition to one or more of the features described herein, the determining the bandwidth includes decreasing the bandwidth from a default bandwidth for one or more of the two or more vehicle sensors that fail to detect an object that is detected by another one or more of the two or more vehicle sensors.

In addition to one or more of the features described herein, the determining the bandwidth is based on a direction of travel of the vehicle and a location of the two or more sensors on the vehicle.

In addition to one or more of the features described herein, the determining the bandwidth is based on an event, wherein the event is a detection by at least one of the two or more vehicle sensors or a change in movement by the vehicle.

In addition to one or more of the features described herein, the determining the bandwidth includes implementing a machine learning algorithm.

In another exemplary embodiment, a system to perform dynamic bandwidth adjustment includes two or more vehicle sensors, wherein the two or more vehicle sensors include a camera, an audio detector, a radar system, or a lidar system. The system also includes a controller configured to obtain input, the input including data from each of the two or more vehicle sensors, determine a bandwidth at which each of the two or more vehicle sensors should provide the data, and provide a control signal to each of the two or more vehicle sensors to respectively adjust the bandwidth for each of the two or more vehicle sensors.

In addition to one or more of the features described herein, the input includes information about environmental conditions.

In addition to one or more of the features described herein, the information about the environmental conditions includes weather information.

In addition to one or more of the features described herein, the input includes information about the vehicle.

In addition to one or more of the features described herein, the information about the vehicle includes location information, direction of travel, or vehicle dynamics information.

In addition to one or more of the features described herein, the controller increases the bandwidth from a default bandwidth for one or more of the two or more vehicle sensors that detect an object.

In addition to one or more of the features described herein, the controller decreases the bandwidth from a default bandwidth for one or more of the two or more vehicle sensors that fail to detect an object that is detected by another one or more of the two or more vehicle sensors.

In addition to one or more of the features described herein, the controller determines the bandwidth based on a direction of travel of the vehicle and a location of the two or more sensors on the vehicle.

In addition to one or more of the features described herein, the controller determines the bandwidth based on an event, wherein the event is a detection by at least one of the two or more vehicle sensors or a change in movement by the vehicle.

In addition to one or more of the features described herein, the controller determines the bandwidth by implementing a machine learning algorithm.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
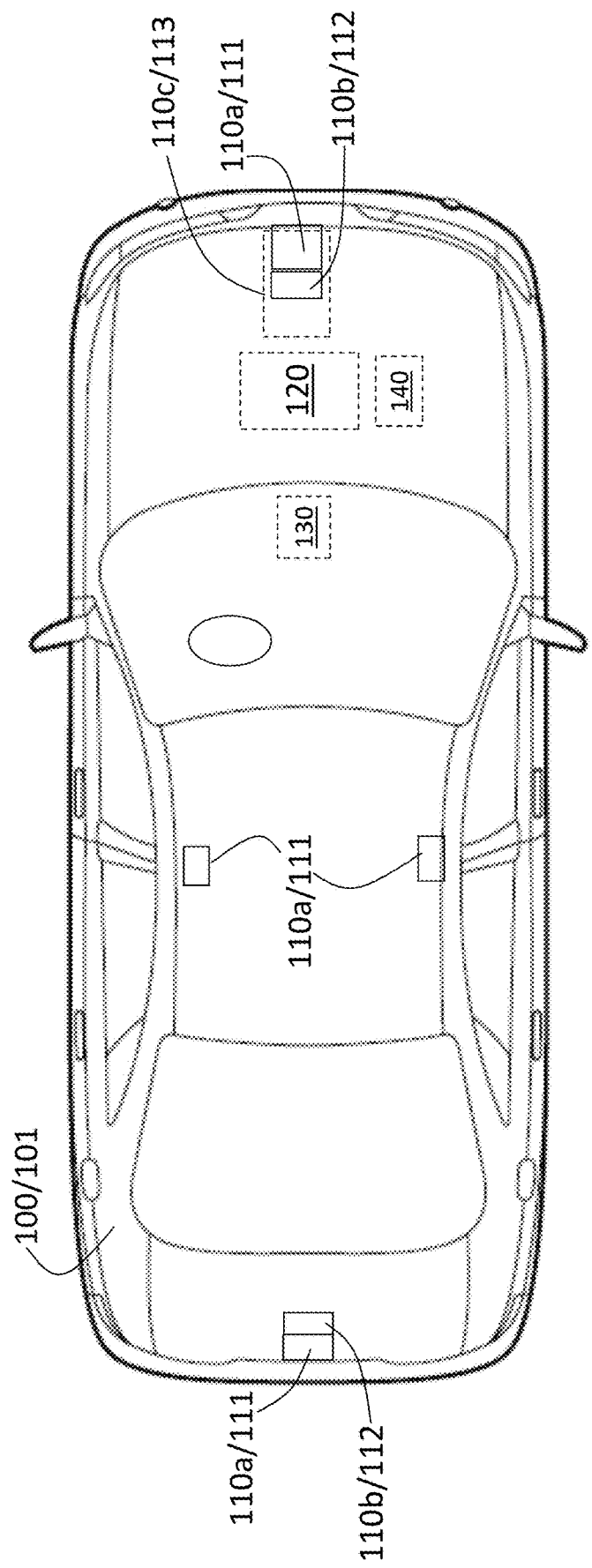
FIG. 1 is a block diagram of a vehicle with dynamic bandwidth adjustment among vehicle sensors according to one or more embodiments.

The following description is merely exemplary in nature and is not intended to limit the present disclosure, its application or uses. It should be understood that throughout the drawings, corresponding reference numerals indicate like or corresponding parts and features.

As previously noted, different types of sensors may provide data to facilitate augmentation or automation of vehicle systems. For example, the radar system may track an object that is moving into the path of the vehicle. The information from the radar system may be used to provide an alert to the driver or to take evasive action with the collision avoidance system, for example. The data from more than one type of sensor may be used together in a scheme referred to as data fusion. In data fusion, data from one type of sensor may validate data from another type of sensor or facilitate the determination of a false alarm, for example. As also previously noted, vehicle sensors currently provide data at a constant bandwidth.

The bandwidth at which each of the sensors provides data affects the available bandwidth for the other sensors to provide data. This is because the volume of data that can be stored and processed by the controller that receives the data from the various sensors is not unlimited. Thus, when all the sensors provide data at a constant bandwidth, the bandwidth set for each sensor must be selected in consideration of the volume of data and the processing load that it generates.

Yet, there may be situations in which one type of sensor provides useful information while another type of sensor does not or cannot provide useful information. For example, in heavy fog, an audio detector may record audio data from a nearby motorcycle but a camera may not obtain images of the motorcycle because the camera field of view (FOV) is obstructed by the fog. In such a situation, having to maintain the data rate from the camera, which cannot provide useful information, is not optimal. Further, the volume of data still provided by the blocked camera prevents a higher data rate for information from the audio detector. Embodiments of the systems and methods detailed herein relate to dynamic bandwidth adjustment among vehicle sensors.

In accordance with an exemplary embodiment, FIG. 1 is a block diagram of a vehicle 100 with dynamic bandwidth adjustment among vehicle sensors 110. The exemplary vehicle 100 in FIG. 1 is an automobile 101. The vehicle includes sensors 110 of different types. As shown, the vehicle 100 includes cameras 111 as one type of sensor 110a, audio detectors (e.g., microphones) 112 as another type of sensor 110b, and a radar system 113 as a third type of sensor 110c. The exemplary sensors 110 are shown for explanatory purposes and are not intended to limit the types, numbers, or positions of sensors 110 according to one or more embodiments. Each of the sensors 110 provides data to a controller 120. The controller 120 may be the same electronic control unit (ECU) that provides control signals to different vehicle systems. The controller 120 may instead be in communication with the vehicle ECU along with the sensors 110.

The controller 120 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. According to additional or alternate embodiments, the controller 120 may implement a machine learning algorithm. The controller 120 not only obtains data from each of the sensors 110 but also provides control signals to the sensors 110 to adjust bandwidth, as discussed herein. The data from the sensors 110 may be raw data for processing by the controller 120, may be processed data that indicates an object location or other information, or may be a combination of the two. Based on the data from sensors 110, the controller 120 may provide information (e.g., driver alerts) for display on a screen of an infotainment system 130 or may provide information to other vehicle systems 140.

In addition to sensor data, the controller 120 obtains a variety of information about the vehicle 100. For example, the infotainment system 130 may include a mapping application that includes a global positioning system (GPS). The infotainment system 130 may provide both the location of the vehicle 100 and information about the location based on mapping (e.g., the vehicle 100 is approaching a railroad crossing). The infotainment system 130 or other vehicle systems 140 may additionally provide environmental conditions (e.g., snowy, foggy, temperature) to the controller 120. Other vehicle systems 140 may provide information to the controller 120 that it uses to make decisions about vehicle operation. The information may include vehicle dynamics, direction (e.g., the vehicle is moving in reverse), and movement (e.g., the vehicle is changing lanes), for example.

Figure 2:
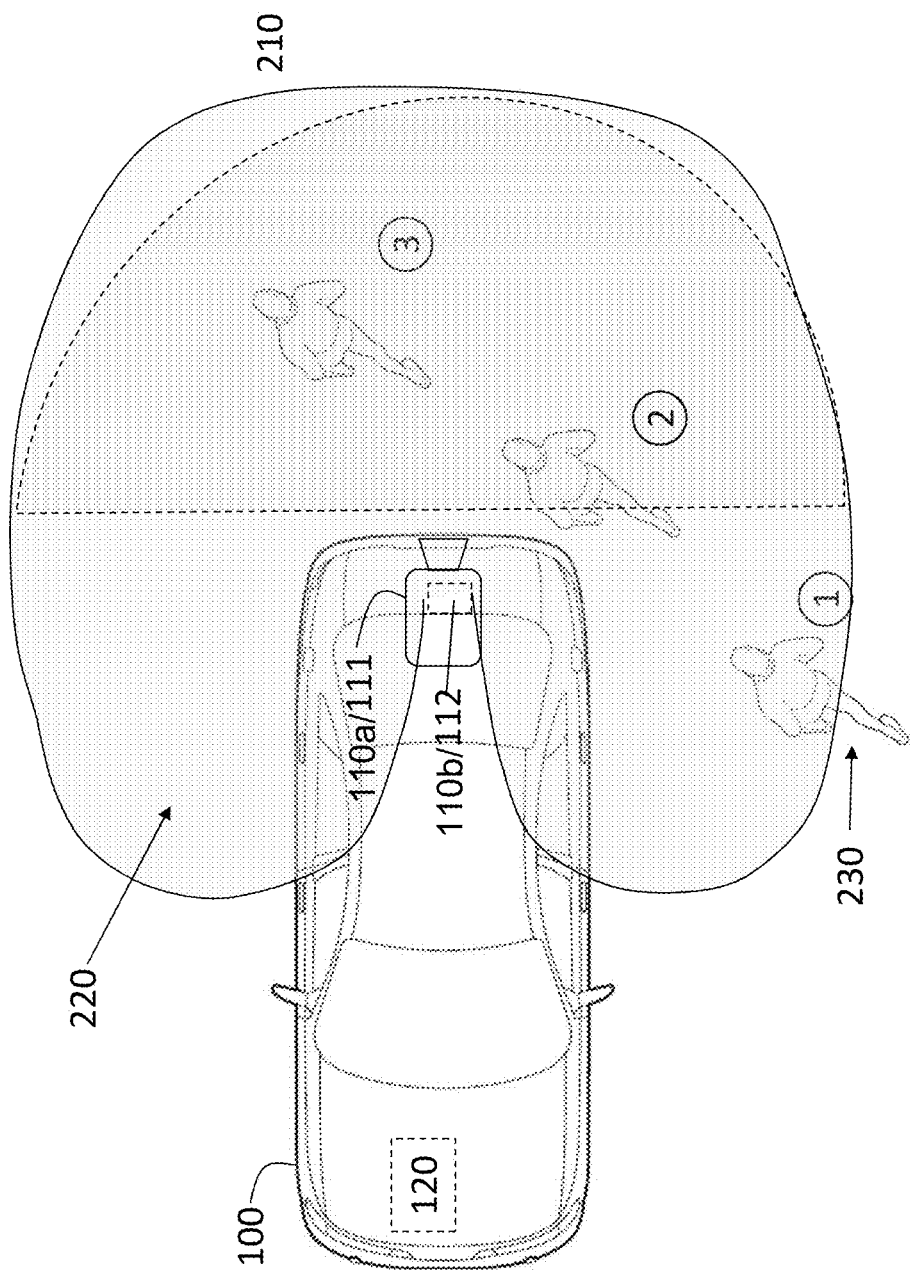
FIG. 2 illustrates a scenario in which dynamic bandwidth adjustment among vehicle sensors is performed according to one or more embodiments.

FIG. 2 illustrates a scenario in which dynamic bandwidth adjustment among vehicle sensors 110 is performed according to one or more embodiments. The vehicle 100 is shown with a camera 111 and an audio detector 112 at the rear of the vehicle 100. While two sensors 110 are discussed for explanatory purposes, any number of sensors 110 may be used and their bandwidth adjusted according to embodiments detailed herein. The camera FOV 210 and audio coverage area 220 are indicated. An object 230 is shown at three different positions 1, 2, 3 relative to the vehicle 100. As FIG. 2 indicates, when the object 230 is at position 1, the object 230 is within the coverage area 220 of the audio detector 112 but not within the FOV 210 of the camera 111. At position 2, the object 230 transitions to a location that is within the FOV 210 of the camera 111 in addition to being within the coverage area 220 of the audio detector 112. At position 3, the object 230 is still within the FOV 210 of the camera 111 and within the coverage area 220 of the audio detector 112.

As FIG. 2 indicates, maintaining the same data rate for data from the camera 111 at positions 1 and 3 of the object 230 is not optimal. This is because the camera 111 does not detect the object 230 at all when the object 230 is at position 1 and, thus, has no information to provide. In addition, once the camera 111 has the object 230 in the camera FOV 210 (at position 2), maintaining the same data rate for data from the audio detector 112 may be unnecessary. By decreasing the data rate of data from one sensor 110, the data rate of data from another sensor 110 may be increased while maintaining the same overall volume of data and processing.

According to one or more embodiments, the controller 120 dynamically adjusts the bandwidth for data received from each of the sensors 110. As discussed with reference to FIG. 3, for the scenario illustrated in FIG. 2, the bandwidth for data from the camera 111 and from the audio detector 112 is adjusted as the object 230 moves from position 1 to position 2 to position 3. Additional information used by the controller 120 may include, for example, an indication that the vehicle 100 is in reverse. If the vehicle were moving forward and, thus, away from the object 230, then adjustment of the data rates for the sensors 110 in the rear of the vehicle 100 may be deemed unnecessary or may be implemented differently (e.g., data rates for the camera 111 and audio detector 112 are both reduced).

Figure 3:
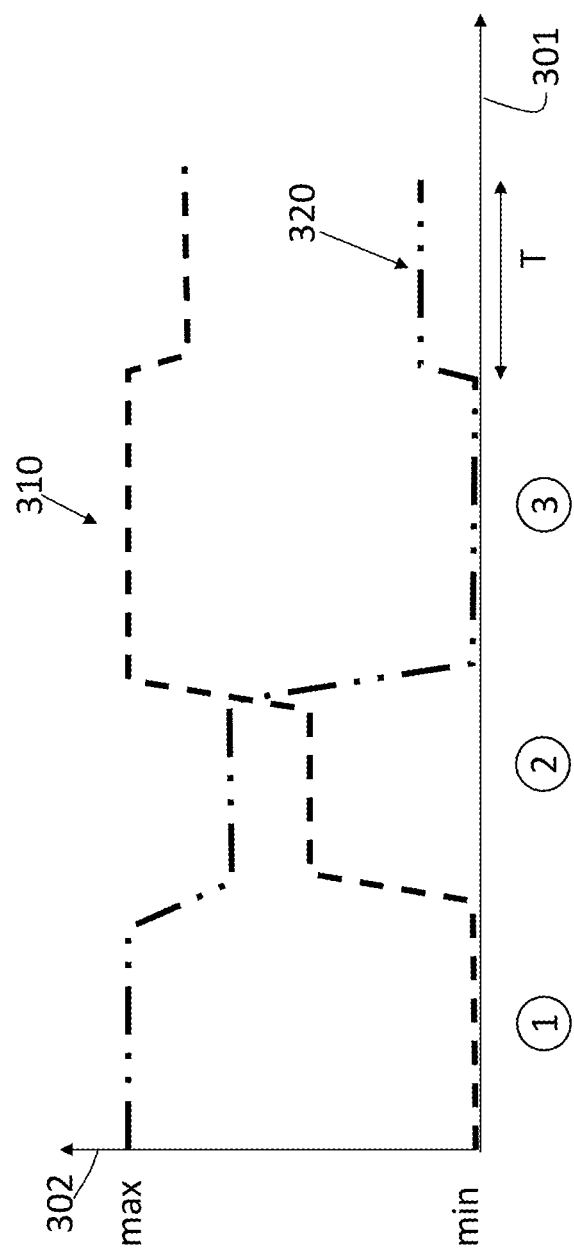
FIG. 3 illustrates exemplary bandwidth control according to one or more embodiments.

FIG. 3 illustrates exemplary bandwidth control according to one or more embodiments. The scenario shown in FIG. 2 corresponds with the bandwidth control shown in FIG. 3, and the three positions 1, 2, 3 are indicated along the time axis 301. The data rate is indicated along axis 302. The bandwidth control is implemented by the controller 120. FIG. 3 shows the camera 111 data rate 310 and the audio detector 112 data rate 320. As FIG. 3 indicates, the audio detector 112 data rate 320 is maximum when the object 230 is at position 1 and is reduced to a minimum data rate as the object 230 moves to position 2 and then to position 3. After the object 230 has moved out of the coverage area 220 of the audio detector 112, at a time period indicated as T, a default data rate is used by the audio detector 112.

As FIG. 3 also indicates, the camera 111 data rate 310 is minimum when the object 230 is at position 1 and is increased to a maximum data rate as the object 230 moves to position 2 and then to position 3. After the object 230 has moved out of the FOV 210 of the camera 111, at a time period indicated as T, a default data rate is used by the camera 111. As FIG. 3 indicates, the default data rate used by the audio detector 112 is lower than the default data rate used by the camera 111 during the time period T. The maximum data rate of every type of sensor 110 need not be the same. According to alternate embodiments, the minimum and maximum data rate for each type of sensor 110 may be different.

Figure 4:
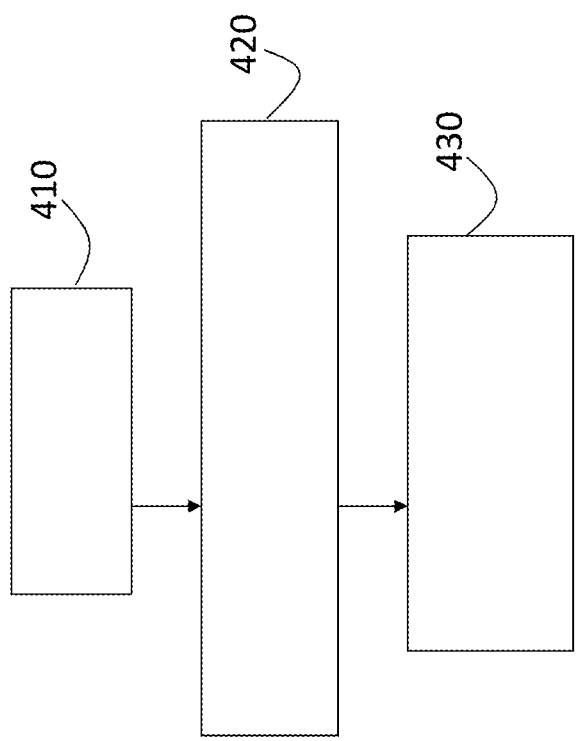
FIG. 4 is a process flow of a method of performing dynamic bandwidth adjustment among vehicle sensors according to one or more embodiments.

FIG. 4 is a process flow of a method of performing dynamic bandwidth adjustment among vehicle sensors 110 according to one or more embodiments. The dynamic bandwidth adjustment is performed by the sensors 110 based on control signals from the controller 120. The bandwidth adjustment may be performed periodically, based on events (e.g., a detection by one of the sensors 110), or according to a combination of both. For example, the controller 120 may initially set the bandwidth for each sensor 110 to a default value. The default data rate for two different types of sensors 110 (e.g., camera 111, radar system 113) may be different. The bandwidth of one of the types of sensors 110 (e.g., camera 111) may be set to the maximum value as a default. The default may be different based on environmental conditions or on vehicle movement. For example, in rain or snow, when the cameras 111 have obstructed views, their data rate may be decreased to the minimum data rate as a default.

At block 410, the controller 120 receives inputs. The inputs may be from different types of sources. One type of source of inputs is the sensors 110 themselves. This input indicates which sensors 110 detect an object and which sensors 110 do not, for example. Other types of sources of inputs are the infotainment system 130 and other vehicle systems 140. These sources provide environmental conditions, vehicle dynamics, and other information that indicates which sensors 110 are of interest according to the particular scenario in which the vehicle 100 is currently operating.

Determining bandwidth adjustments, at block 420, may be rule-based, implemented by a machine learning algorithm, or performed via other known techniques. For example, any sensor 110 that has detected an object may be instructed to increase its bandwidth to its maximum value while every sensor 110 that has not detected the object at the same time is instructed to decrease its bandwidth to its minimum value. This rule-based approach may be refined to different percentages of the maximum bandwidth based on different confidence levels for the detections, for example. As previously noted, determining the bandwidth adjustments, at block 420, may be triggered by an event. The event may be detection by one of the sensors 110 or a change in movement of the vehicle 100 (e.g., a lane change, a change from moving backwards to moving forward).

The event may also be non-function of one of the sensors 110. A combination of events may trigger a change in bandwidth, as well. For example, when information from the GPS and mapping systems indicates that the vehicle 100 is approaching a railroad crossing, the controller 120 may also determine that the camera 111 view is obstructed (e.g., the lens is dirty). In this case, the controller 120 may increase the bandwidth of the audio detectors 112 while decreasing the bandwidth of the camera 111. The audio detectors 112 may detect a chime that accompanies the closing of a gate or an approaching train. The controller 120 may issue an alert (e.g., via the infotainment system 130) or control vehicle systems 140 accordingly. While obstruction of one sensor 110 (e.g., the camera 111) results in a reduction in its bandwidth, the location of the vehicle 100 (e.g., railroad crossing) or a different event might trigger a corresponding increase in the bandwidth of one or more particular sensors 110 (e.g., audio detectors 112).

The detection-based adjustment may be weighted according to the movement of the vehicle 100 and environmental conditions. For example, if there is a sound in the environment that saturates the audio detectors 112 and makes other sounds indiscernible, the detection by the audio detectors 112 may be weighted lower as a factor for increasing the data rate from the audio detectors 112. Similarly, if the vehicle 100 is moving forward, then detection by a rear-facing camera 111 may be weighted lower as a factor for increasing the data rate from that camera 111. At block 430, providing control signals to the sensors 110 from the controller 120 facilitates the adjustment in bandwidth based on the determination at block 420.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of performing dynamic bandwidth adjustment among two or more vehicle sensors, the method comprising:

receiving input at a processor, the input including data from each of the two or more vehicle sensors, wherein the two or more vehicle sensors include a camera, an audio detector, a radar system, or a lidar system;

determining, using the processor, a bandwidth at which each of the two or more vehicle sensors should provide the data; and providing, by the processor, a control signal to each of the two or more vehicle sensors to adjust the bandwidth based on the determining, wherein the determining the bandwidth includes decreasing the bandwidth from a default bandwidth for one or more of the two or more vehicle sensors that fail to detect an object that is detected by another one or more of the two or more vehicle sensors.

2. The method according to claim 1, wherein the receiving the input includes receiving information about environmental conditions.

3. The method according to claim 2, wherein the receiving the information about the environmental conditions includes receiving weather information.

4. The method according to claim 1, wherein the receiving the input includes receiving information about the vehicle.

5. The method according to claim 4, wherein the receiving the information about the vehicle includes receiving location information, direction of travel, or vehicle dynamics information.

6. The method according to claim 1, wherein the determining the bandwidth includes increasing the bandwidth from a default bandwidth for one or more of the two or more vehicle sensors that detect an object.

7. The method according to claim 1, wherein the determining the bandwidth is based on a direction of travel of the vehicle and a location of the two or more sensors on the vehicle.

8. The method according to claim 1, wherein the determining the bandwidth is based on an event, wherein the event is a detection by at least one of the two or more vehicle sensors or a change in movement by the vehicle.

9. The method according to claim 1, wherein the determining the bandwidth includes implementing a machine learning algorithm.

10. A system to perform dynamic bandwidth adjustment, the system comprising:
two or more vehicle sensors, wherein the two or more vehicle sensors include a camera, an audio detector, a radar system, or a lidar system;
a controller configured to obtain input, the input including data from each of the two or more vehicle sensors, determine a bandwidth at which each of the two or more vehicle sensors should provide the data, and provide a control signal to each of the two or more vehicle sensors to respectively adjust the bandwidth for each of the two or more vehicle sensors, wherein the controller decreases the bandwidth from a default bandwidth for one or more of the two or more vehicle sensors that fail to detect an object that is detected by another one or more of the two or more vehicle sensors.

11. The system according to claim 10, wherein the input includes information about environmental conditions.

12. The system according to claim 11, wherein the information about the environmental conditions includes weather information.

13. The system according to claim 10, wherein the input includes information about the vehicle.

14. The system according to claim 13, wherein the information about the vehicle includes location information, direction of travel, or vehicle dynamics information.

15. The system according to claim 10, wherein the controller increases the bandwidth from a default bandwidth for one or more of the two or more vehicle sensors that detect an object.

16. The system according to claim 10, wherein the controller determines the bandwidth based on a direction of travel of the vehicle and a location of the two or more sensors on the vehicle.

17. The system according to claim 10, wherein the controller determines the bandwidth based on an event, wherein the event is a detection by at least one of the two or more vehicle sensors or a change in movement by the vehicle.

18. The system according to claim 10, wherein the controller determines the bandwidth by implementing a machine learning algorithm.

* * * * *